United States Patent Office 3,413,114
Patented Nov. 26, 1968

3,413,114
PROCESS FOR RECOVERING OSMIUM
Alexander Illis, Copper Cliff, Ontario, Bernardus Jacobus Brandt, Thompson, Manitoba, and Alan Manson, Lively, Ontario, Canada, assignors to The International Nickel Company, Inc., New York, N.Y., a company of Delaware
No Drawing. Filed Nov. 8, 1965, Ser. No. 506,899
Claims priority, application Canada, Jan. 7, 1965, 920,259
11 Claims. (Cl. 75—121)

The present invention relates to the concentration and/or recovery of osmium from osmium-containing materials, and more particularly to a special method for the treatment of osmium-containing materials to concentrate and/or recover osmium.

Many ores of the base metals cobalt, copper, iron and nickel contain varying amounts of precious metals, e.g., platinum, palladium, iridium, rhodium, ruthenium, gold and silver. Generally associated with these precious metals is osmium which may be present in amounts less than one percent of the total precious metal contents. In rare instances, the presence of the precious metals, by itself, economically justifies the recovery of the base metal. More commonly, the precious metals are by-products of base metal refining operations. In fact, the concentrations of the precious metals including osmium in many base metal ores are so small that economically the provision of separate steps for their recovery is unwarranted until the precious metals become concentrated as an incident to the concentration of the base metals. As an example, even when the total precious metal content of the residue resulting from the base metal refining steps has reached levels of one to five percent, the residue must be further concentrated to recover the precious metals, but at this point it becomes economically advantageous to provide separate recovery steps.

A wide diversity of attempts has been made to further concentrate and/or recover the precious metals contained in residues from base metal refining processes. One process is to smelt the residue with lead and cupel the resulting lead alloy to obtain a highly enriched precious-metals alloy. Another process is to subject the residue to an oxidizing roast and subsequently to dissolve the base metals in sulfuric acid. An even further process is to leach the residue with a boiling solution of sulfuric acid and manganese dioxide. It has also been attempted to subject the residue to a sulfating roast at temperatures of 700° F. to 800° F., then leaching the resulting soluble base metal sulfates to leave an enriched or concentrated precious-metals residue. All of these processes have the disadvantage that excessive losses of osmium occur. In fact, in some instances the presence of osmium in residues was unknown since the refining process employed resulted in complete loss of osmium and the osmium content of the original ore was so low as to be practically undetectable therein.

It has now been discovered that losses of osmium contained in residues from base metal refining processes can be held to a minimum by proper control of the conditions employed in further concentrating and enriching the precious metal content of a base metal residue.

It is an object of the present invention to reduce osmium losses in concentrating precious-metal-containing materials.

Another object of the present invention is to provide a greater recovery of osmium from precious-metal-containing materials.

Other objects and advantages will become apparent from the following description.

Broadly stated, the present invention contemplates treating materials containing a minor amount of a precious metal and a major amount of at least one base metal from the group consisting of iron, copper, nickel and cobalt to concentrate the precious metal content by sulfating the material with one to three times its weight of concentrated sulfuric acid at a temperature below about 500° F. and then leaching the sulfated material to remove base metals such as iron, copper, nickel and cobalt. The residue, highly enriched in precious metals, is then hydrometallurgically treated to isolate and recover osmium and the other precious metals.

The conditions of the sulfating roast are of great importance. Osmium reacts with oxygen to form osmium tetroxide which is volatile at temperatures as low as 129° C. Thus, the sulfating roast must be controlled so as not to volatilize appreciable quantities of osmium tetroxide while solubilizing the base metals. We have now found that at temperatures below about 500° F. and above about 300° F. conditions are sufficiently oxidizing to sulfate base metals such as copper, nickel, iron and cobalt with concentrated sulfuric acid; at the same time, however, these conditions are sufficiently reducing to prevent the formation of volatile osmium tetroxide.

After the sulfating roast, the material is leached with water to remove base metal sulfates including sulfates of iron, copper, nickel and cobalt. The residue is subsequently treated to volatilize osmium tetroxide which is collected in an alkaline solution, and the resulting solution is then treated to precipitate a reducible osmium compound such as hydrated osmium dioxide. Metallic osmium is obtained by reacting the reducible osmium compound with hydrogen at elevated temperatures over 500° F.

In carrying out the invention, an osmium-containing material, e.g., an anode slime containing up to about 2.5% precious metals including up to about 0.02% osmium, with the remainder being base metals from the group consisting of nickel, copper, iron and cobalt, up to 20% sulfur and small amounts of other impurities such as selenium, is heated with concentrated sulfuric acid at temperatures below 500° F. to sulfate the base metals. The sulfated material is leached with water to dissolve the solubilized base metals. The sulfating and leaching steps are repeated until the base metal content is reduced to an acceptable level. As an example, when working with secondary nickel anode slimes from the electrorefining of Sudbury ores, the sulfating and leaching steps are repeated until the nickel and copper contents have each been lowered to below about one percent. Reduction of the base metals to these levels generally requires that the sulfating and leaching steps be repeated three to five times.

To recover retained osmium in the residue, the residue can be calcined in air or oxygen-enriched air at about 1500° F. to 1800° F. to volatilize osmium as the tetroxide and any sulfur as the dioxide and selenium as the dioxide and to leave an osmium-impoverished precious metal residue which is treated by conventional processes to recover the individual precious metals. The exit gases are scrubbed with sufficient alkaline solution, such as an aqueous solution of sodium hydroxide or potassium hydroxide, to collect the osmium therefrom. The osmium-containing alkaline solution is treated for the separation and recovery of osmium and any selenium by acidifying the solution with sulfuric acid and by the addition of an oxidizing agent such as hydrogen peroxide, potassium permanganate, etc. The acid solution is boiled to volatilize osmium tetroxide which is absorbed in an alkaline solution containing an organic reducing compound, such as methyl alcohol, ethyl alcohol, formic acid, etc., and any selenium is recovered from the acid solution by known means. The osmium-containing absorbing solution is neutralized with sulfuric acid and gently boiled to precipitate hydrated osmium dioxide which is filtered off, washed, dried and heated to a temperature in excess of about 500° F., e.g., about 1000° F., in a hydrogen atmosphere to yield substantially pure metallic osmium.

The sulfated and leached residue can alternatively be treated by slurrying the residue to form a slurry having a solids content of 10% to 30%, by weight, with an aqueous solution of a strong alkali such as sodium hydroxide, potassium hydroxide, etc., containing about twice as much alkali by weight as solids. The slurry is heated to a temperature of about 300° F. to 500° F. while introducing air or oxygen-enriched air at a total pressure of 400 to 1000 p.s.i.g. to solubilize osmium and any sulfur, selenium and arsenic and to leave a residue containing the other precious metals. When the reaction is complete, the slurry is filtered is treated with hydrogen at about 150° F. to 250° F. and under superatmospheric pressures up to about 500 p.s.i.g. to precipitate the osmium and any other platinum group metals which were dissolved during the pressure leaching stage. Alternatively, the alkaline-leached slurry is not filtered but is treated with hydrogen at a temperature of about 150° F. to 250° F. at a pressure up to about 500 p.s.i.g. to precipitate osmium and any of the other platium metals which were dissolved during the pressure leaching stage but leaving any sulfur, selenium and arsenic in solution. In either case, the solids from the hydrogen treatment are filtered, washed and treated for the final separation and refining of osmium and associated metals. The osmium is recovered by calcining the hydrogen-treated residue in air or oxygen-enriched air at a temperature of about 1500 F. to 1800° F. to volatilize osmium as the tetroxide together with any residual amount of selium. The exit gases are scrubbed with an aqueous alkaline solution containing an organic reducing compound to collect the volatilized osmium. The absorbing solution is neutrlized with dilute sulfuric acid and gently boiled to precipitate hydrated osmium dioxide. The hydrated osmium dioxide is reduced to metallic osmium as outlined hereinbefore by hydrogen reduction above about 500° F.

As a further alternative, the sulfated and leached residue can be heated in a hydrogen atmosphere at a temperature of about 1000° F. to 1800° F. to volatilize sulfur and selenium but not osmium. The residue is cooled and treated with aqua regia to provide an osmium-enriched residue. The residue from the aqua regia leach is fused with sodium peroxide. The fused material is water leached and the resulting solution is acidified with sulfuric acid. Osmium tetroxide is distilled off by adding hydrogen peroxide and heating. The osmium tetroxide may be further purified by scrubbing through a dilute solution of perchloric acid and then collecting the osmium tetroxide in an alkaline solution containing an organic reducing compound and water. This solution is carefully neutralized and gently boiled to yield a finely divided black precipitate of hydrated osmium dioxide. The osmium dioxide is recovered and reduced to metallic osmium in a reducing atmosphere at elevated temperatures.

When collecting osmium tetroxide volatilized from a resdue in a scrubbing solution from which the osmium will be subsequently revolatilized and collected in a second collecting solution, the alkaline solution is an aqueous solution containing sufficient sodium hydroxide, potassium hydroxide, or other strong base to collect the osmium tetroxide, e.g., at least sufficient alkali to combine with the osmium to form a water soluble osmate. The amount of oxidizing agent such as hydrogen peroxide, potassium permanganate, etc., added to the alkaline solution is not critical, and only sufficient quantities to promote osmium tetroxide formation upon boiling are necessary. The collecting solution from which hydrated osmium dioxide is precipitated is an aqueous alkaline solution which contains sufficient alkali to insure collection of osmium tetroxide as a water soluble osmate and a sufficient amount of an organic reducing compound such as methyl alcohol, formic acid, etc., to insure precipitation of hydrated osmium dioxide upon heating.

For the purpose of giving those skilled in the art a better understanding of the invention, the folowing illustrative examples are given:

EXAMPLE I

One thousand parts of anode slimes, analyzing 0.011% osmium and about 2.5% of other precious metals with the remainder being essentially base metal from the group consisting of nickel and copper, were carried through sulfation at a controlled temperature of not more than 500° F. followed by water leaching of the base metals until a low level of copper and nickel was reached. At this point the residue weighed 100 parts and analyzed 0.111% osmium, which represented all of the osmium in the starting material. Calcination at a temperature of about 1750° F. resulted in the volatilization of 88% of the osmium which was collected in a scrubbing solution of sodium hydroxide. The residual slimes contained 12% of the osmium. The sodium hydroxide solution was then acidified with sulfuric acid, treated with hydrogen peroxide, and the osmium was then distilled off as the voltatile tetroxide. The vapors were passed through a trap containing an aqueous solution of hydrogen peroxide (2% $H_2O_2$ by weight and finally absorbed in a solution containing 10 parts of sodium hydroxide, 10 parts of alcohol, and the balance water. This solution was neutralized by sulfuric acid and the osmium was precipitated as the hydrated dioxide. The precipitate was filtered off, dried and treated with hydrogen at 1000° F. to yield 0.086 part of metallic osmium of better than 98% purity.

EXAMPLE II

One thousand parts by weight of anode slimes having essentially the composition as the material described in Example I were carried through sulfation at 450° F. followed by water leaching of the base metals until a low level of copper and nickel was reached. Three sulfations and water leaches were required. At this point the residue weighed 100 parts and analyzed 0.111% of osmium which represented all of the osmium in the starting material. The 100 parts of this sulfated material was pressure leached with 200 parts of sodium hydroxide at 10% solids for 2 hours at a temperature of 450° F. and a pressure of 500 p.s.i.g. of oxygen. The slurry was filtered and the solution treated with hydrogen at 220° F. and a pressure of 350 p.s.i.g. of hydrogen for 1 hour. On filtering, a precipitate weighing 7.99 parts was obtained assaying 1.39% osmium which represented all of the osmium in the original material. Calcination of this residue in air at 1700° F. resulted in volatilization of 95% of the osmium, which was collected in a solution containing 10 parts of sodium hydroxide, 10 parts of methyl alcohol and the balance water. Careful neutralization of this solution with sulfuric acid followed by gentle boiling yielded a precipitate of fine black hydrated osmium dioxide. This was filtered off, washed, dried, and heated in hydrogen at 1000° F. to yield 0.10 part of metallic osmium at better than 98% purity.

EXAMPLE III

One thousand parts by weight of anode slimes having essentially the composition described in Example I were carried through sulfation and water leaching until a low level of copper and nickel was reached. Three sulfations were carried out at a temperature of 450° F. followed by water leaching of the base metals. At this point, the residue weighed 100 parts and analyzed 0.111% osmium which represented all of the osmium in the starting material. Fifty parts of the sulfated slimes were pressure leached with 50 parts of sodium hydroxide and 300 parts of water for 2 hours at 450° F. and a pressure of 500 p.s.i.g. of oxygen. Following the pressure leaching stage, the apparatus was cooled to 200° F., the pressure was reduced to atmospheric and the oxygen was replaced by hydrogen at 350 p.s.i.g. for 1 hour. On cooling and filtering, a residue weighing 32.3 parts was obtained assaying 0.172% osmium which represented all of the osmium in the starting material. Calcination of this residue in air at 1700° F. resulted in the volatilization of over 99% of the osmium which was collected in a solution containing 10 parts of sodium hydroxide, 10 parts of methyl alcohol and the balance water. Careful neutralization of this solution followed by gentle boiling yielded a precipitate of hydrated osmium dioxide. This was filtered off, washed, dried and reduced in a stream of hydrogen at 1000° F. to yield 0.05 part of metallic osmium of better than 98% purity.

EXAMPLE IV

One thousand parts by weight of anode slimes, analyzing 0.015% osmium and about 2.5% of other precious metals, with the remainder being essentially base metal from the group consisting of nickel and copper, were sulfated at 450° F. and water leached to remove solubilized based metals. This was carried out four times to reach a suitably low level of copper and nickel, i.e., less than 1% of each. At this point the residue weighed 96 parts and analyzed 0.156% osmium which represented all of the osmium in the starting material. Ninety-five parts of this sulfated material was then heated in a stream of hydrogen at 560° F. for 1 hour to remove the sulfur together with a small amount of selenium, and then at 1200° F. for 2 hours to volatilize the remainder of the selenium. Finally, the residue was heated at 1700° F. for 1 hour under hydrogen to passivate the osmium against subsequent chemical attack. At this point the material weighed 62.5 parts and analyzed 0.237% osmium which represented virtually all of the osmium in the starting material. The platinum, palladium and gold were dissolved by treatment with aqua regia which resulted in a loss of 13% of the osmium. The remaining 87% of the osmium was recovered by fusing the residue in a nickel crucible with sodium peroxide, acidifying the solution obtained by water leaching the melt with $H_2SO_4$ and distilling off the osmium by the addition of hydrogen peroxide and heating. The vapors were scrubbed by passing them through a dilute solution of perchloric acid and then collected in a solution containing 10 parts of sodium hydroxide, 10 parts of alcohol and the balance water. Careful neutralization of this solution followed by gentle boiling yielded a precipitate of fine black hydrated osmium dioxide. This was filtered off, washed, dried and reduced in a stream of hydrogen at 1000° F. to yield 0.13 part of metallic osmium of better than 98% purity.

It can be seen from the above examples that the practice of this invention permits substantially complete recovery of osmium from osmium-containing materials. Although the examples are directed to the recovery of osmium from secondary nickel anode slimes, it is to be understood that the present invention is applicable to any osmium-containing residue resulting from a base metal refining operation.

It is further seen from the foregoing that materials which were formerly thought to be osmium-free may have actually contained osmium but any osmium present was lost during processing by prior art techniques. The present invention not only recognizes the cause of such losses but also provides an uncomplicated process for preventing osmium losses and for economically recovering the osmium values.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. The process of recovering osmium from a material containing asmium and base metals which comprises sulfating said material at a temperature below about 500° F. with concentrated sulfuric acid to solubilize the base metals, leaching the roasted material to remove the base metals and recovering osmium from the residue.

2. The process of recovering osmium from osmium-containing materials which comprises sulfating the material below about 500° F. with concentrated sulfuric acid to solubilize base metals, leaching the base metals from the material leaving a precious metal residue, volatilizing the osmium as the tetroxide from the residue, absorbing the volatilized osmium tetroxide in an alkaline solution, precipitating an osmium compound from the alkaline solution, recovering the osmium compound and reducing the osmium compound to metallic osmium in a reducing atmosphere at elevated temperatures.

3. The process of claim 2 wherein the sulfating and leaching steps are repeated to lower the content of each base metal in the residue to below about one percent.

4. A process for recovering osmium from osmium-containing materials comprising sulfating the osmium-containing material at below 500° F. to solubilize base metals, leaching the base metals from the sulfated material leaving a residue which is enriched in precious metals, calcining the residue in an oxidizing atmosphere to volatilize osmium as the tetroxide, recovering the volatilized osmium tetroxide by scrubbing with an alkaline solution, acidifying the resulting alkaline solution, boiling the acidified solution to volatilize osmium tetroxide, collecting the volatilized osmium tetroxide in a second alkaline solution, precipitating a reducible osmium compound from the second alkaline solution and treating the precipitated osmium compound to obtain metallic osmium.

5. The process of claim 4 wherein the calcining temperature is between about 1500° F. to 1800° F.

6. The process of claim 4 wherein an oxidizing agent is added to the acidified solution before boiling.

7. A process for recovering osmium from materials containing base metals from the group consisting of copper, nickel, cobalt and iron comprising sulfating the base metals at a temperature below about 500° F. to solubilize the base metals, leaching the sulfated material to leave a residue enriched with osmium, slurrying the enriched residue with an alkali, introducing a gaseous oxidizing agent under superatmospheric pressures while heating the slurry to a temperature of about 300° F. to 500° F. to form a solution containing osmium, heating the solution containing osmium to about 150° F. to 250° F. under a hydrogen atmosphere at a pressure of up to about 500 p.s.i.g. to form a precipitate which contains metallic osmium, calcining the precipitate at elevated temperatures to volatilize osmium tetroxide, collecting the osmium tetroxide in an alkaline solution, precipitating a reducible osmium compound from the alkaline solution and treating the osmium compound to obtain metallic osmium.

8. A process as described in claim 7 wherein the hydrogen treatment is carried out before filtering the slurry.

9. A process as described in claim 7 wherein the slurry is filtered and the filtrate is given the hydrogen treatment.

10. A process as described in claim 7 wherein the calcining temperature is about 1500° F. to about 1800° F.

11. A process for recovering metallic osmium from a residue resulting from the refining of base metals from the group consisting of nickel, cobalt, copper and iron which comprises sulfating the residue at a temperature below about 500° F. to solubilize the base metals, leaching the base metals to leave a residue enriched in osmium, heating the enriched osmium-containing residue in a hydrogen atmosphere to volatilize volatile impurities, treating the highly enriched residue with aquea regia to dissolve any other platinum metals present, fusing the residue resulting from the aqua regia treatment with sodium hydroxide, leaching the fused residue with water, acidifying the solution resulting from the water leach, adding an oxidizing agent to the solution, distilling osmium tetroxide from the solution, collecting the distillate in an alkaline solution, precipitating a reducible osmium compound from the alkaline solution and treating the osmium compound to obtain metallic osmium.

References Cited

UNITED STATES PATENTS 1,896,807  2/1933  Bauer _____ 75—83

OTHER REFERENCES

Chemical Reviews, "The Platinum Metals," vol. 32, No. 3, June 1943, p. 295–322.

Rare Metals Handbook," 2nd edition, Reinhold.

"Copper" by Butts, 1954, p. 270–272, Reinhold, New York.

HYLAND BIZOT, *Primary Examiner.*